United States Patent
Liu et al.

(10) Patent No.: US 9,652,089 B2
(45) Date of Patent: May 16, 2017

(54) TOUCH PANEL STACKUP

(75) Inventors: Chen-Yu Liu, Taoyuan County (TW); Cheng-Ping Liu, Taoyuan County (TW)

(73) Assignee: TPK TOUCH SOLUTIONS INC., Taipei (TW)

( * ) Notice: Subject to any disclaimer, the term of this patent is extended or adjusted under 35 U.S.C. 154(b) by 630 days.

(21) Appl. No.: 12/942,056

(22) Filed: Nov. 9, 2010

(65) Prior Publication Data

US 2012/0113043 A1 May 10, 2012

(51) Int. Cl.
*G06F 3/044* (2006.01)

(52) U.S. Cl.
CPC .................... *G06F 3/044* (2013.01)

(58) Field of Classification Search
CPC ............................... G06F 2203/04103
See application file for complete search history.

(56) References Cited

U.S. PATENT DOCUMENTS

| | | | |
|---|---|---|---|
| 6,814,452 B2 | 11/2004 | Kusuda | |
| 7,339,579 B2 | 3/2008 | Richter | |
| 2003/0090803 A1* | 5/2003 | Kusuda | G02F 1/133 359/601 |
| 2004/0141110 A1 | 7/2004 | Yu | |
| 2004/0252269 A1* | 12/2004 | Murade | 349/149 |
| 2006/0097991 A1* | 5/2006 | Hotelling et al. | 345/173 |
| 2008/0128848 A1* | 6/2008 | Suzuki | H01L 23/481 257/448 |
| 2008/0165158 A1 | 7/2008 | Hotelling | |
| 2009/0102814 A1 | 4/2009 | Lin | |
| 2009/0314621 A1* | 12/2009 | Hotelling | G06F 3/0416 200/600 |
| 2010/0039398 A1* | 2/2010 | Lin | G06F 3/041 345/173 |
| 2010/0039407 A1* | 2/2010 | Chuang | 345/174 |
| 2010/0084088 A1* | 4/2010 | Nakadate | 156/273.7 |
| 2010/0164881 A1* | 7/2010 | Kuo | G06F 3/044 345/173 |
| 2010/0182250 A1* | 7/2010 | Kang et al. | 345/173 |
| 2010/0321326 A1* | 12/2010 | Grunthaner et al. | 345/174 |
| 2011/0141034 A1* | 6/2011 | Lai | G06F 3/041 345/173 |
| 2011/0210935 A1* | 9/2011 | Chuang | 345/174 |
| 2011/0242011 A1* | 10/2011 | Wu et al. | 345/173 |
| 2011/0291987 A1* | 12/2011 | Wang | G06F 3/044 345/174 |

FOREIGN PATENT DOCUMENTS

| | | |
|---|---|---|
| CN | 101271373 A | 9/2008 |
| CN | 201298084 Y | 8/2009 |
| CN | 101533319 A | 9/2009 |

* cited by examiner

*Primary Examiner* — William Boddie
*Assistant Examiner* — Bryan Earles
(74) *Attorney, Agent, or Firm* — Cooper Legal Group, LLC

(57) ABSTRACT

A touch panel stackup comprises a substrate having a substantially transparent first region and a substantially opaque second region, a sensing electrode detecting a tactile signal, a conductive circuit electrically coupled with the sensing electrode, and a masking element configured on the second region of the substrate, wherein the sensing electrode, the conductive circuit, and the masking element are integrally formed on the substrate.

24 Claims, 13 Drawing Sheets

TOUCH PANEL STACKUP

BACKGROUND OF THE INVENTION

1. Field of the Invention

The present invention relates to a touch panel stackup. More specifically, the invention relates to the touch panel stackup integrally formed on a singular substrate.

2. Description of Related Art

Touch panels are popular input devices. When the user touches a certain position on the touch panel, corresponding to the text or the images on the underneath display device, the touch panel senses the tactile signals and transmits them to a controller for further signal processing. The controller processes the tactile signals and outputs signals corresponding to the touched position. There are several types of touch panels, for example, resistive types, capacitive types, infrared types, surface acoustic wave types, etc. For instance, the capacitive touch panels detect the difference of capacitance of the touch panel. When the user touches the touch panel, the capacitance on the corresponding position is changed. The touch panel and the controller detect and calculate the difference in capacitance and then output corresponding signals.

The conventional touch panel includes one or more layers of sensing electrodes, conductive circuits, masking elements, a supporting substrate, and a protective lens substrate providing anti-scratch, anti-glare, and/or anti-reflective function. In the fabricating process of conventional touch panels, the components are formed separately on the supporting substrate and the protective lens substrate. Afterwards, the supporting substrate and the protective lens substrate are laminated to form the touch panel. For example, the sensing electrodes are formed on the supporting substrate, and the masking elements and the conductive circuits are formed on the protective lens substrate. After laminating the supporting substrate and the protective lens substrate, the conductive circuits are electrically coupled with the sensing electrodes for transmitting tactile inputs. The masking elements can cover the conductive circuits to eliminate the visual interference of the conductive circuit when the users watch the information on the display. The conventional two-substrate approaches increase the thickness of the touch panels. Moreover, a precise positioning is needed in the lamination process to properly connect the sensing electrodes and the conductive circuits. The manufacturing complexity is therefore increased.

SUMMARY OF THE INVENTION

An embodiment of a touch panel stackup is disclosed and comprises: a singular integrated substrate having a substantially transparent first region and a substantially opaque neighboring region, a sensing electrode detecting a tactile signal, a conductive circuit electrically coupled with the sensing electrode, and a masking element configured on the neighboring region of the substrate, wherein the sensing electrode, the conductive circuit, and the masking element are integrally formed on the substrate.

BRIEF DESCRIPTION OF THE DRAWINGS

The above and other features of the present disclosure becomes more apparent by describing in detail embodiments thereof with reference to the accompanying drawings, in which.

DETAILED DESCRIPTION

Figure 1:
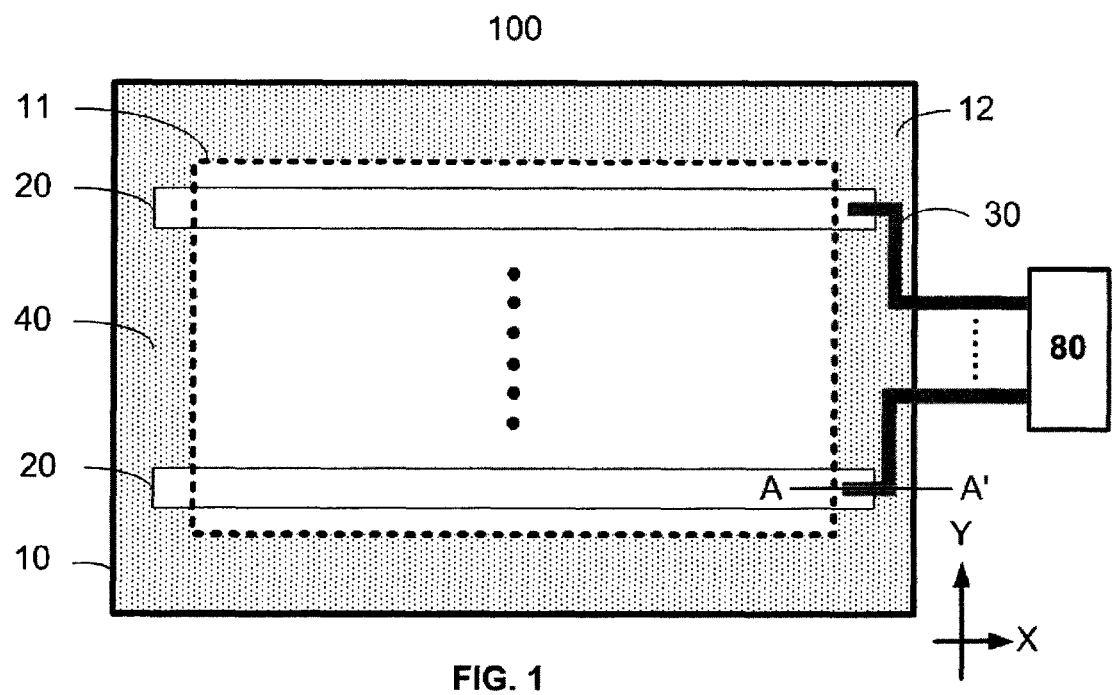
FIG. 1 is a top view of a touch panel according to a first embodiment of the present invention.

A top view of a first embodiment of the present invention, a touch panel 100, is shown in FIG. 1. A plurality of sensing electrodes 20, a plurality of conductive circuits 30, and a masking element 40 are integrally formed on a substrate 10. In this embodiment, the sensing electrodes 20 and the conductive circuits 30 configured in the X direction are used. The sensing electrodes 20 and the conductive circuits 30 can also be configured in the Y direction and/or in both the X and the Y directions.

The invention aims to manufacture a touch panel by using a singular substrate. The substrate has supporting and protective functions and comprises a viewable area and a neighboring area which is next to the viewable area. The touch panel can be used in various display devices. A method to manufacture a slim type touch panel is to have the sensing electrodes, the conductive circuits, the masking elements, and other components fabricated on a singular substrate. The touch panels can be directly attached to the display devices. Accordingly, the thickness and the cost of one substrate can be reduced, and the lamination process is eliminated.

The substrate 10 can be made of organic or inorganic non-conductive materials, such as, plastic, glasses, etc. The non-conductive substrate 10 is substantially transparent. Anti-scratch, anti-glare, and/or anti-reflective elements can be pasted, printed, dyed, sputtered, or coated on the substrate 10. According to the application, material with suitable hardness can be chosen as the substrate 10, for example, tempered glasses, flexible elastic materials, etc. A substantially transparent viewable area 11 on the substrate 10 is used to show the information on the underneath display device. A substantially opaque neighboring area 12 is positioned between the viewable area 11 and the edges of the substrate 10. The neighboring area 12 covers the elements that interfere with the information shown on the underneath display device.

The sensing electrodes 20 can be made of Indium Tin Oxide (ITO), Aluminum Zinc Oxide, Zinc Tin Oxide, or other substantially transparent conductive materials, for example, conductive glasses, conductive polymer, carbon nanotube, etc. The sensing electrodes 20 are configured or disposed on the viewable area 11 and the neighboring area 12, and have electrode patterns for sensing tactile inputs. The conductive circuits 30 are electrically coupled with the sensing electrodes 20 in the neighboring area 12 for transmitting the sensed tactile signals to a controller 80. The conductive circuits 30 can be made of aluminum, silver, copper, or the same conductive materials as the sensing electrode 20.

The conductive circuits 30 with metallic colors or other opaque colors visually interfere with the information shown on the underneath display device. A masking element 40 is configured or disposed on the neighboring area 12 for substantially covering the conductive circuits 30 and the backlight of the display device. The visual interference can therefore be reduced. The masking element 40 does not need to be completely opaque. The degree of opaqueness can be chosen for different applications. For example, black or other substantially opaque photoresist, resin, or ink can be used to block the backlight leakage of the display device and reduce the visual interference of the conductive circuits 30. The masking element 40 can be pasted, printed, dyed, sputtered, or coated on the substrate 10. The elements in this embodiment and the other embodiments demonstrated below can be made of the aforementioned materials or other suitable materials according to the different requirements of the applications.

Figure 22:
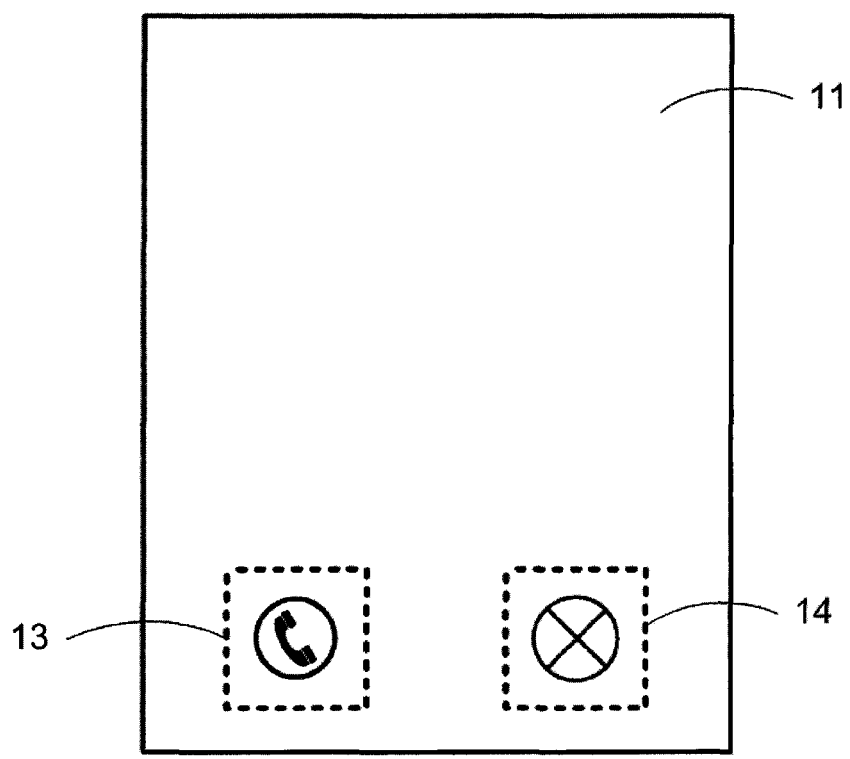
FIG. 22 is a top view of a touch panel according to another embodiment of the present invention.

In FIG. 1, the neighboring area 12 is configured or disposed on the periphery of the touch panel 100. The neighboring area 12 can also be configured on an edge of the substrate 10 or the location and shape of neighboring area 12 can be changed according to the design of production. In FIG. 22, the viewable area 11 of the touch panel 2200 has opaque areas 13 and 14 designated for special functions, for instance, the dialing and hang-up function of the mobile phone, and the geometric distribution of sensing electrodes 20 and conductive circuits 30 can be designed accordingly. The conductive circuits 30 can be configured or disposed under the opaque areas 13 and 14. The layout of the sensing electrodes 20 can be changed accordingly. Therefore, the touch panel 2200 can have larger viewable area 11 and be used with borderless display devices.

Figure 23:
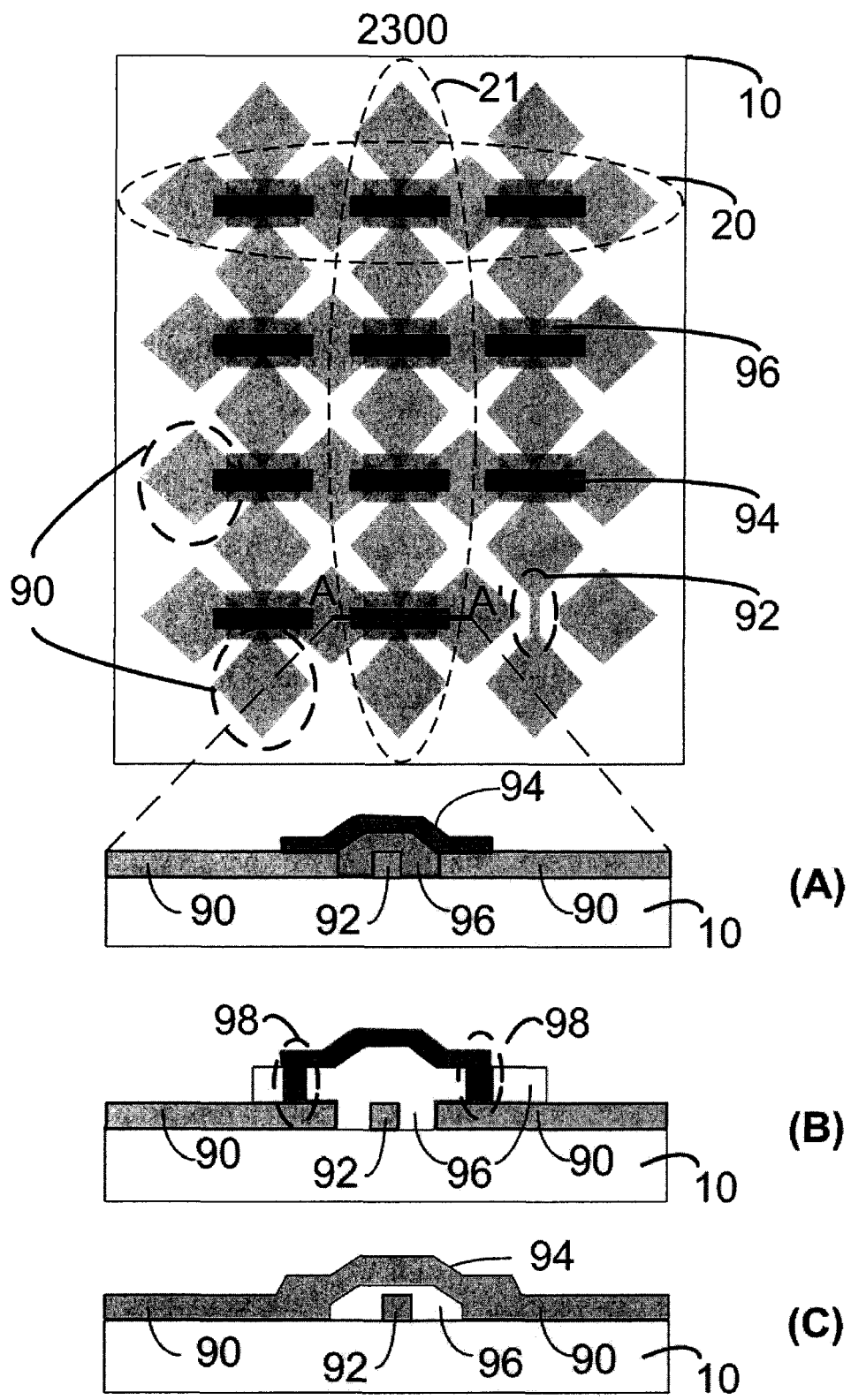
FIG. 23 is a top view and sectional views of a touch panel according to still another embodiment of the present invention.

The embodiment in FIG. 1 only uses the horizontal sensing electrodes 20. If horizontal sensing electrodes 20 and vertical sensing electrodes 21 are used at the same time an isolating element will need to have to be used to electrically isolate the sensing electrodes 20 from sensing electrodes 21 or the electrode patterns need to be had a distinctive design. In the embodiment shown in FIG. 23 the horizontal sensing electrodes 20 and vertical sensing electrodes 21 are used. The isolating element 96 and conductors 94 in the bottom right of FIG. 23 are removed to show the relative positions of conductors 92 and other elements. The sensing electrodes 20 include a plurality of electrode patterns 90 and a plurality of conductors 94. The sensing electrodes 21 also include a plurality of electrode patterns 90 and conductors 92. The isolating element 96 electrically isolates the conductors 92 from conductors 94. The sensing electrodes 20 and 21 are therefore electrically isolated and erroneous conducting signal can be prevented. In the embodiment shown in sectional view (A), the isolating element 96 covers the conductors 92. The conductors 94 are configured or disposed on the isolating element 96 and electrically coupled with the electrode patterns 90. In an alternative embodiment shown in sectional view (B), the isolating element 96 covers the conductors 92 and at least part of the electrode patterns 90. The conductors 94 is configured or disposed on the isolating element 96 and electrically coupled with the electrode patterns via the through holes 98. In another embodiment shown in sectional view (C), the isolating element 96 covers the conductors 92. The conductor 94 and the electrode patterns 90 are made of the same material at the same time. Alternative, the electrode patterns 90 are configured first and electrically coupled with the conductor 94 made of the same material.

Figure 24:
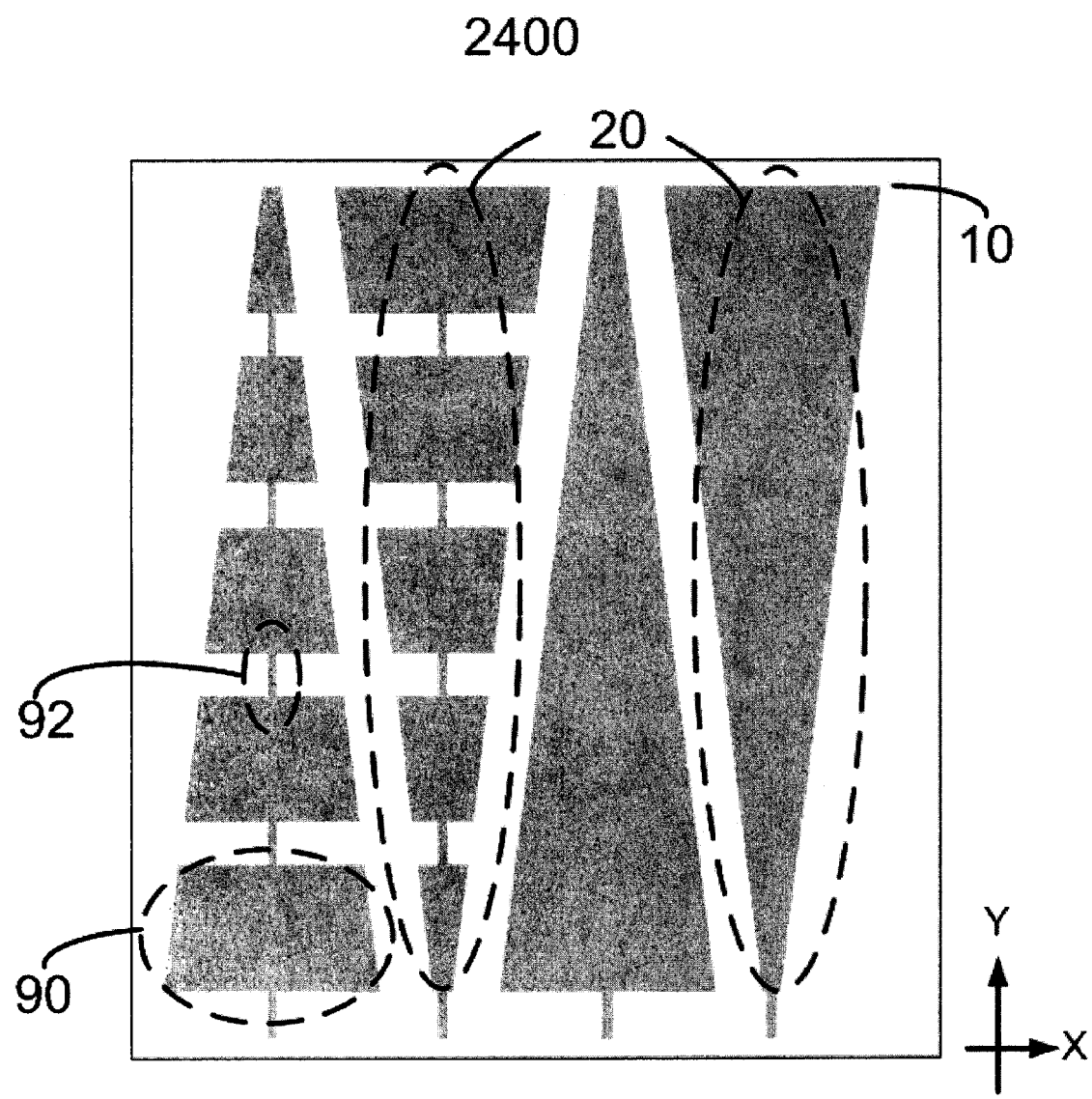
FIG. 24 is a top view of a touch panel according to yet another embodiment of the present invention.

As shown in FIG. 24, the two sensing electrodes 20 at the left side are embodied with a plurality of conductors 92 and several electrode patterns 90 of different shapes. The two sensing electrodes 20 at the right side, each comprises only a single electrode pattern 90. The embodiment in FIG. 24 is a capacitive touch panel, wherein the sensing electrodes 20 are positioned in the Y direction. Different capacitance changes will be produced when users touch different position on electrode patterns 20, which allow us to locate Y coordinates. Therefore, the electrode patterns 20 can detect the tactile signals in the X direction and Y direction. Moreover, the electrode patterns 90 can also be made of the same size and shape but have different conductivity or other kinds of address coded schemes can be adopted so that the electrode patterns 90 can sense tactile signals in the first and second direction. The geocoded electrode patterns can also be used in the other embodiments of the present invention.

Figure 2:
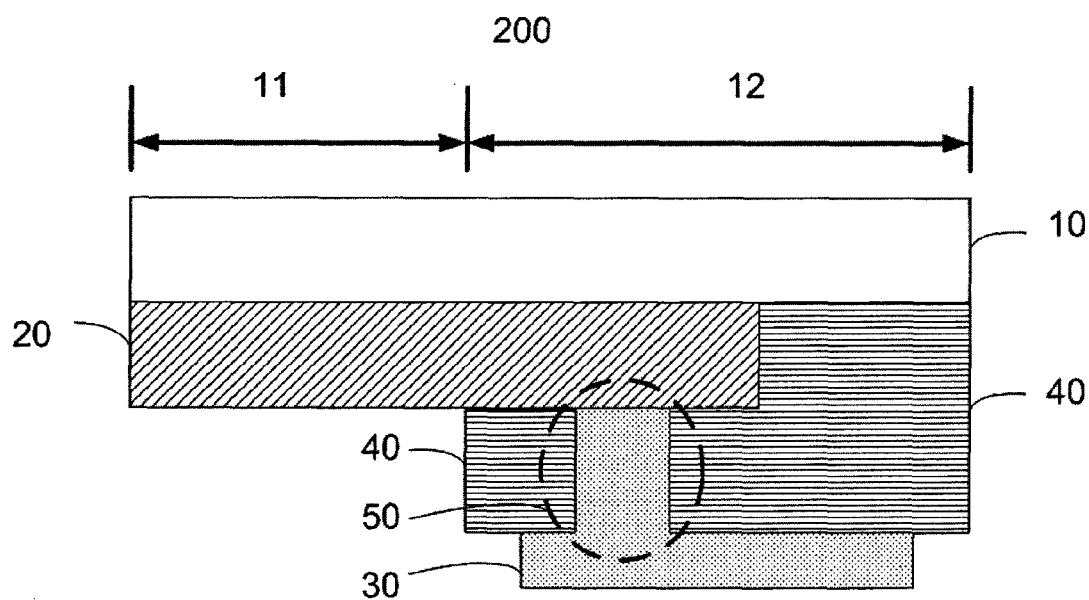
FIG. 2 is a sectional view of a touch panel according to the first embodiment of the present invention.

FIG. 2 is a cross sectional view along the A-A' line in the touch panel 100 in FIG. 1. Touch panel stackup 200 comprises a singular integrated substrate 10 which has supporting and protective functions and is made of a transparent non-conductive material, for instance, glass, plastic, etc. The substrate 10 comprises a viewable area and a neighboring area next to the viewable area. The sensing electrode 20, made of ITO or other suitable materials, is configured or disposed under the substrate 10 for sensing the tactile signals. The substantially opaque and non-conductive masking element 40 is configured or disposed under the sensing electrode 20. The through hole 50 is configured or disposed at a suitable location of the masking element 40 for coupling the conductive circuit 30 with the sensing electrode 20 and therefore transmitting the sensed tactile signals. The masking element 40 covers most of the conductive circuit 30. The dimension of the through hole 50 and the material of the conductive circuit 30 are properly chosen to reduce the viewable area of the conductive circuit 30 from the through hole 50. A through hole 50 of μm-level dimension, for example, less than 30 μm in diameter, can reduce the visual interference of the conductive circuit 30. Alternatively, the sensing electrode 20 can be configured or disposed in the through hole 50 for coupling with the conductive circuit 30.

Figure 3:
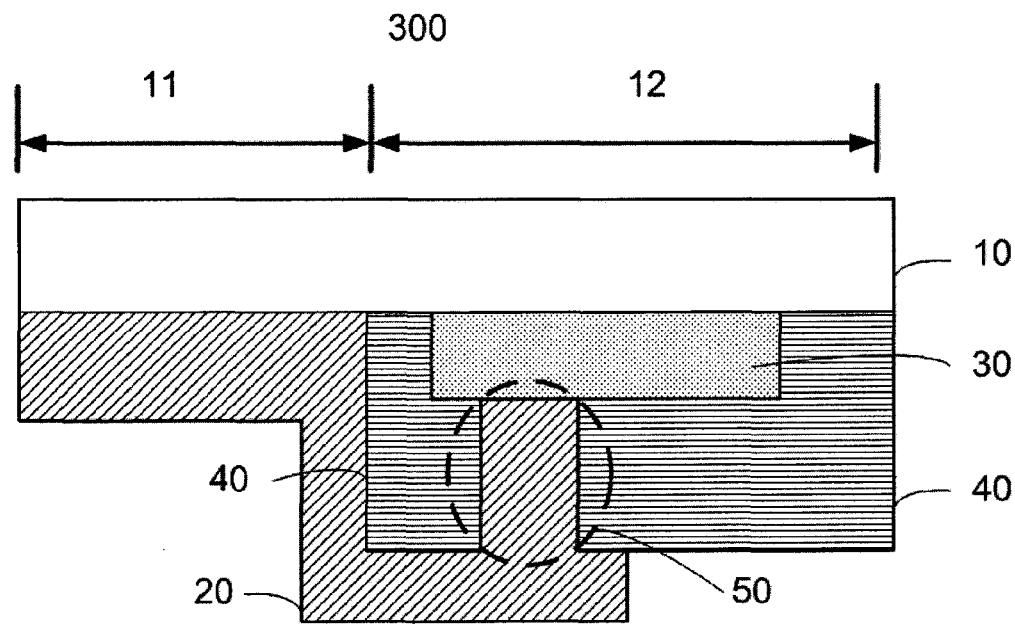
FIG. 3 is a sectional view of a touch panel according to a second embodiment of the present invention.

A second embodiment, a touch panel 300, is shown in FIG. 3. A sensing electrode 20, a conductive circuit 30, a masking element 40, and a through hole 50 are integrally formed on a singular substrate 10. The substrate 10 comprises a viewable area and a neighboring area next to the viewable area and has supporting and protective functions. The conductive circuit 30 is configured or disposed between the substrate 10 and the masking element 40. The material, the dimension, the viewable area, and the position of the conductive circuit 30 are properly chosen to reduce the visual interference. For example, the viewable area of the conductive circuit 30 is limited in μm level or the position of the conductive circuit 30 is chosen to be covered by the casing of the display device. In this embodiment, the sensing electrode 20 is configured or disposed in the through hole 50 for coupling with the conductive circuit 30. Alternatively, the conductive circuit 30 can be configured or disposed in the through hole 50 for coupling with the sensing electrode 20.

Figure 4:
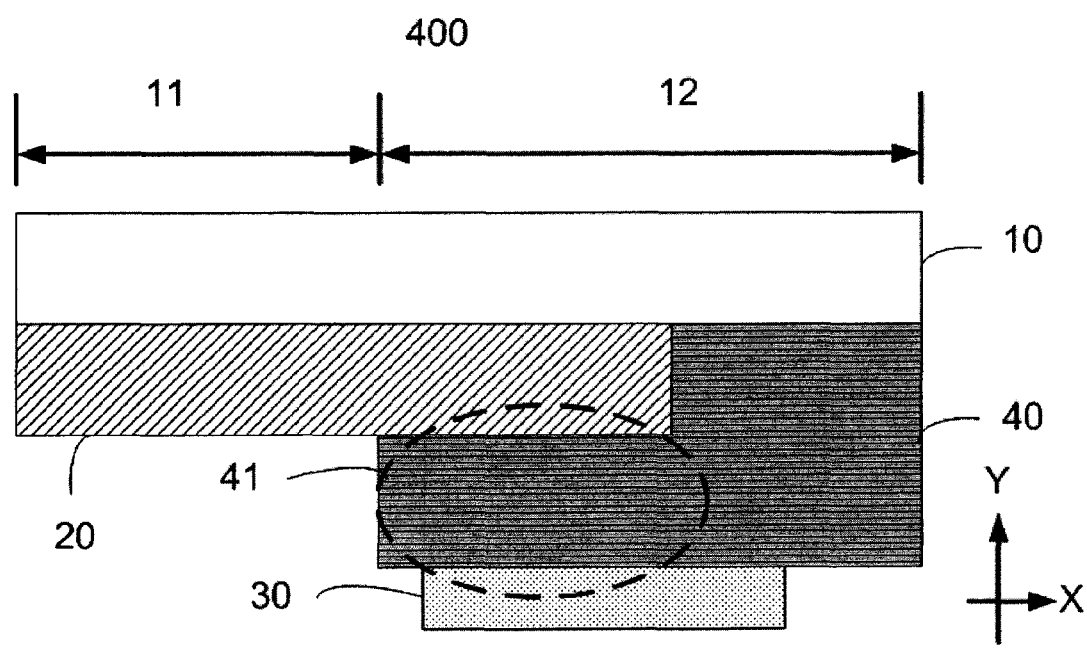
FIG. 4 is a sectional view of a touch panel according to a third embodiment of the present invention.

A third embodiment, a touch panel 400, is shown in FIG. 4. A sensing electrode 20, a conductive circuit 30, and a masking element 40 are integrally formed on a singular integrated substrate 10. The substrate 10 comprises a viewable area and a neighboring area next to the viewable area and has supporting and protective functions. The masking element 40 is made of opaque and anisotropic conductive material. By processing the anisotropic conductive material in the area 41, for example, clamping in the Y direction, the masking element 40 between the sensing electrode 20 and the conductive circuit 30 is conductive in the Y direction. Because the resistivity of the masking element 40 in the X direction is high, the masking element 40 can be regarded as non-conductive. Therefore, the sensing electrode 20 and the conductive circuit 30 do not couple with other sensing electrodes or conductive circuits in the X direction. Thus, erroneous conducting signals can be prevented. For example, some anisotropic conductive materials have the resistivity of less than 15K ohm in the processed area. The resistivity of masking element 40 among the X direction of masking element 40, the sensing electrode 20 or the conductive circuit 30, can be as high as 10^8 ohm/30 um and it can be regarded as non-conductive. A through hole is not needed in the masking element 40 in this embodiment. Instead, the masking element 40, made of the anisotropic conductive material, is used to cover the conductive circuit 30 and to couple the sensing electrode 20 with the conductive circuit 30. Besides, the distance between two conductive circuits 30 can be configured to be farther than the distance between the conductive circuit 30 and the sensing electrode 20. Thus, the impedance between the conductive circuit 30 and the sensing electrode 20 is smaller than the impedance between two conductive circuits 30. Erroneous conducting signals can be prevented.

Figure 5:
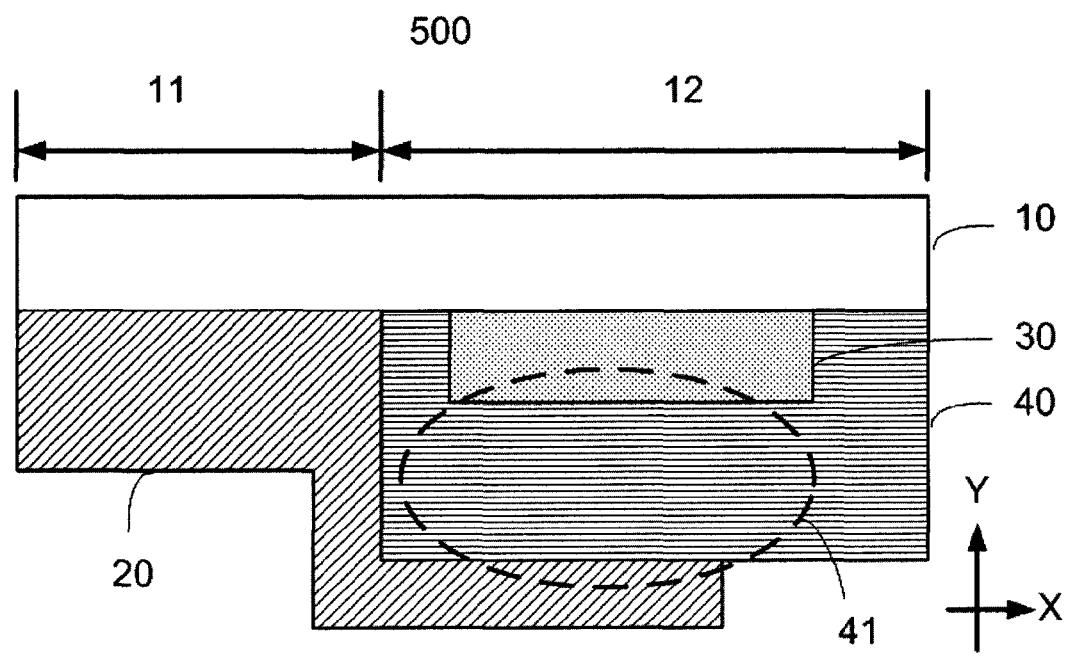
FIG. 5 is a sectional view of a touch panel according to a fourth embodiment of the present invention.

A fourth embodiment, a touch panel 500, is shown in FIG. 5. A sensing electrode 20, a conductive circuit 30, and a masking element 40 are integrally formed on a singular substrate 10. The substrate 10 comprises a viewable area and a neighboring area next to the viewable area and has supporting and protective functions. The conductive circuit 30 is configured or disposed between the substrate 10 and the masking element 40. The material, the dimension, the viewable area, and the position of the conductive circuit 30 are properly chosen to reduce the visual interference. For example, the viewable area of the conductive circuit 30 is limited in μm level or the position of the conductive circuit 30 is chosen to be covered by the casing of the display device. In this embodiment, an anisotropic conductive material is used as the masking element 40 for coupling the sensing electrode 20 with the conductive circuit 30. By processing the anisotropic conductive material in the area 41, for example, clamping in the Y direction, the masking element 40 between the sensing electrode 20 and the conductive circuit 30 is conductive in the Y direction. Because of the high resistivity of the masking element 40 in the X direction, the masking element 40 can be regarded as non-conductive. Therefore, the sensing electrode 20 and the conductive circuit 30 do not couple with other sensing electrodes or conductive circuits in the X direction. Thus, erroneous conducting signals can be prevented. Besides, the distance between two conductive circuits 30 can be configured to be farther than the distance between the conductive circuit 30 and the sensing electrode 20. Thus, the impedance between the conductive circuit 30 and the sensing electrode 20 is smaller than the impedance between two conductive circuits 30. Erroneous conducting signals can be prevented.

Figure 6:
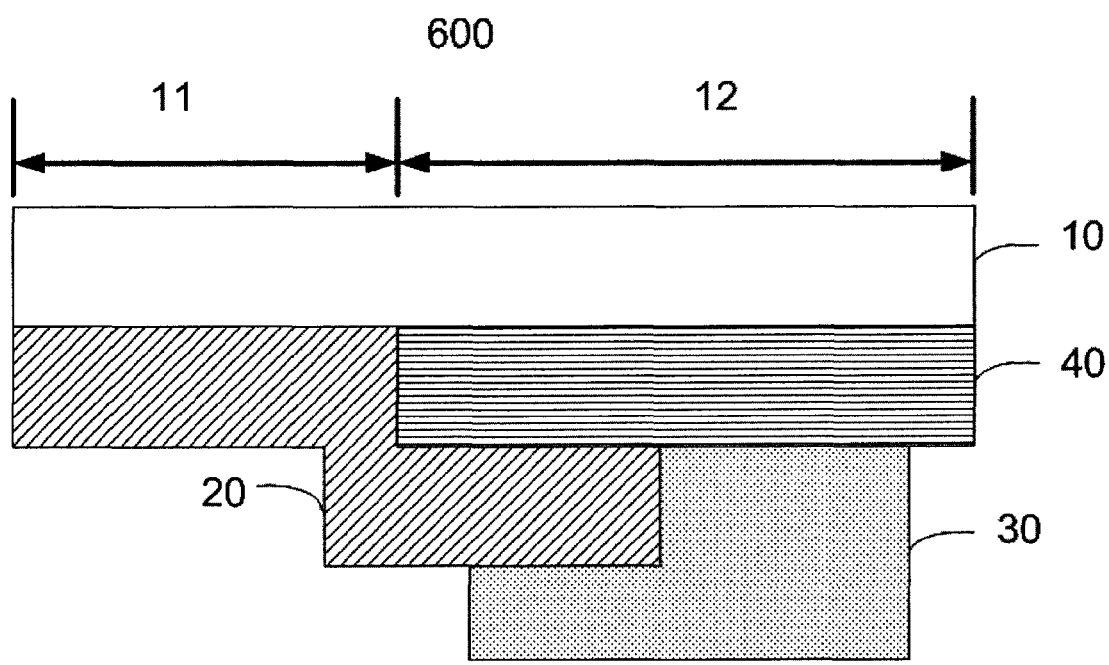
FIG. 6 is a sectional view of a touch panel according to a fifth embodiment of the present invention.

A fifth embodiment, a touch panel 600, is shown in FIG. 6. A sensing electrode 20, a conductive circuit 30, and a masking element 40 are integrally formed on a singular substrate 10. The substrate 10 comprises a viewable area and a neighboring area next to the viewable area and has supporting and protective functions. The sensing electrode 20 is configured or disposed between the conductive circuit 30 and the masking element 40. The masking element 40 substantially covers the conductive circuit 30. The sensing electrode 20 and the conductive circuit 30 are directly coupled under the masking element 40. A conductive adhesive can be optionally applied between the sensing electrode 20 and the conductive circuit 30 for a stronger connection.

Figure 7:
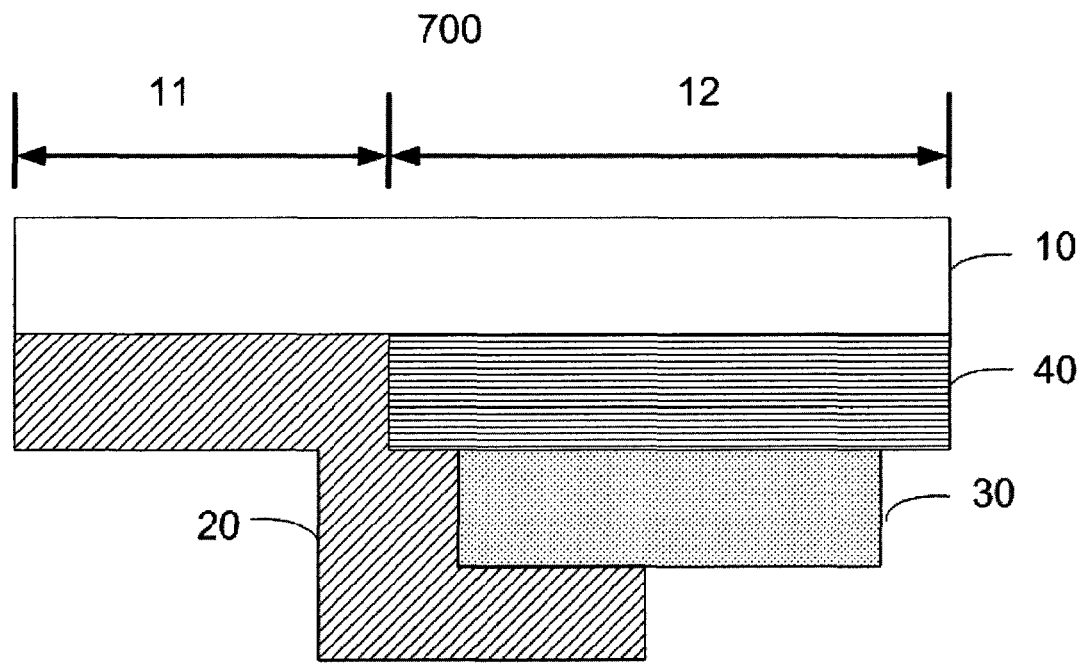
FIG. 7 is a sectional view of a touch panel according to a sixth embodiment of the present invention.

A sixth embodiment, a touch panel 700, is shown in FIG. 7. A sensing electrode 20, a conductive circuit 30, and a masking element 40 are integrally formed on a singular substrate 10. The substrate 10 comprises a viewable area and a neighboring area next to the viewable area and has supporting and protective functions. The conductive circuit 30 is configured or disposed between the sensing electrode 20 and the masking element 40. The masking element 40 substantially covers the conductive circuit 30. The sensing electrode 20 and the conductive circuit 30 are directly coupled under the masking element 40. A conductive adhesive can be optionally applied between the sensing electrode 20 and the conductive circuit 30 for a stronger connection.

Figure 8:
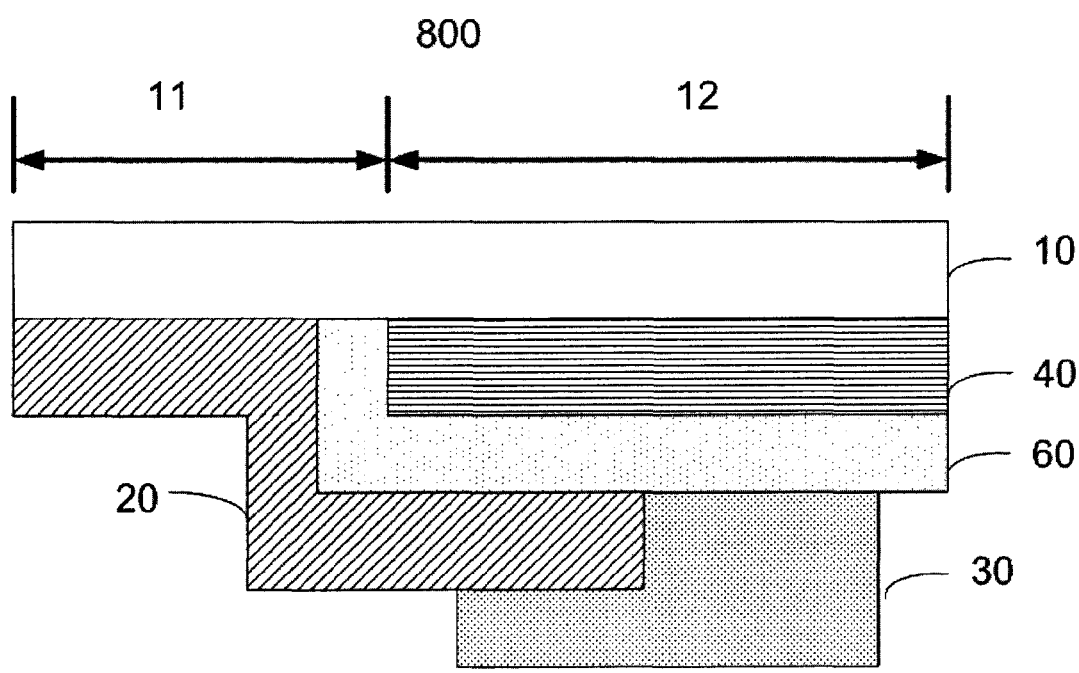
FIG. 8 is a sectional view of a touch panel according to a seventh embodiment of the present invention.

A seventh embodiment, a touch panel 800, is shown in FIG. 8. A sensing electrode 20, a conductive circuit 30, a masking element 40, and a dielectric element 60 are integrally formed on a singular substrate 10. The substrate 10 comprises a viewable area and a neighboring area next to the viewable area and has supporting and protective functions. The sensing electrode 20 is configured or disposed between the conductive circuit 30 and the dielectric element 60. The masking element 40 substantially covers the conductive circuit 30. The sensing electrode 20 and the conductive circuit 30 are directly coupled or electrically coupled with a conductive adhesive under the masking element 40. The dielectric element 60 is configured or disposed between the sensing electrode 20 and the masking element 40 and between the conductive circuit 30 and the masking element 40. Thus, the sensing electrode 20 and the conductive circuit 30 are better isolated from the masking element 40 and do not conduct with other sensing electrodes or conductive circuits via the masking element 40. The dielectric element 60 can be made of silicon, silicon oxide (SiOx), silicon nitride (SixNy), non-conductive polymer, etc. The dielectric element 60 can also be configured or disposed between the sensing electrode 20 and the masking element 40, and/or between the conductive circuit 30 and the masking element 40 in other embodiments. When the dielectric element 60 is adopted in the embodiment, the masking element 40 has a lower isolating requirement and can be selected from more materials.

Figure 9:
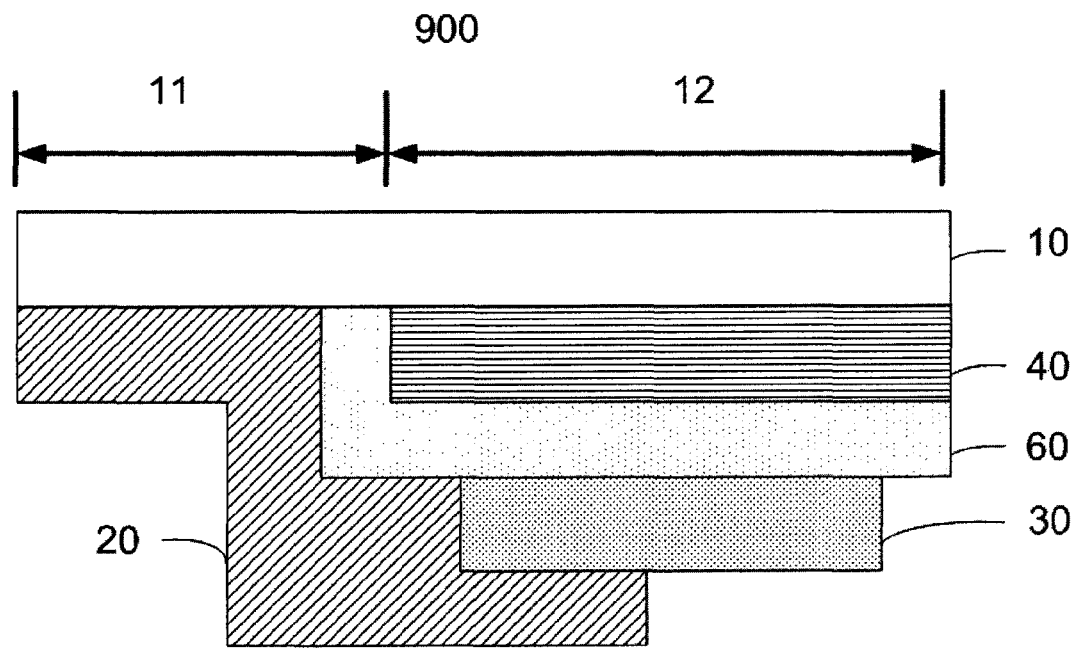
FIG. 9 is a sectional view of a touch panel according to an eighth embodiment of the present invention.

An eighth embodiment, a touch panel 900, is shown in FIG. 9. A sensing electrode 20, a conductive circuit 30, a masking element 40, and a dielectric element 60 are integrally formed on a singular substrate 10. The substrate 10 comprises a viewable area and a neighboring area next to the viewable area and has supporting and protective functions. The conductive circuit 30 is configured or disposed between the sensing electrode 20 and the dielectric element 60. The masking element 40 substantially covers the conductive circuit 30. The sensing electrode 20 and the conductive circuit 30 are directly coupled or electrically coupled with a conductive adhesive under the masking element 40. The dielectric element 60 is configured or disposed between the sensing electrode 20 and the masking element 40, and between the conductive circuit 30 and the masking element 40. Thus, the sensing electrode 20 and the conductive circuit 30 are better isolated from the masking element 40 and do not conduct with other sensing electrodes or conductive circuits via the masking element 40.

Figure 10:
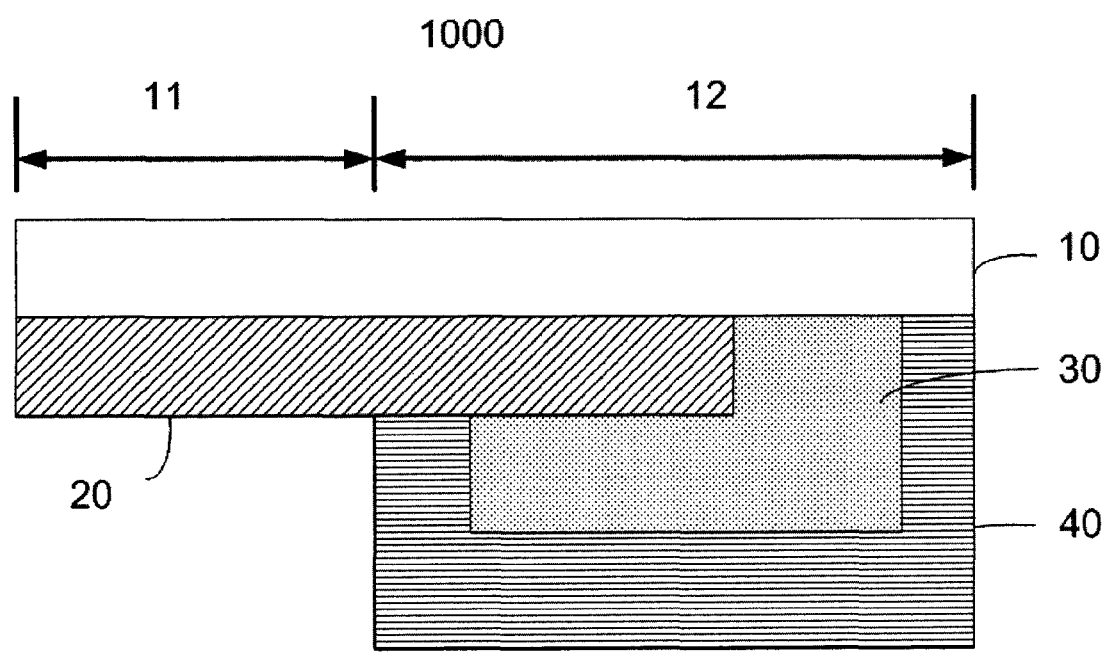
FIG. 10 is a sectional view of a touch panel according to a ninth embodiment of the present invention.
Figure 11:
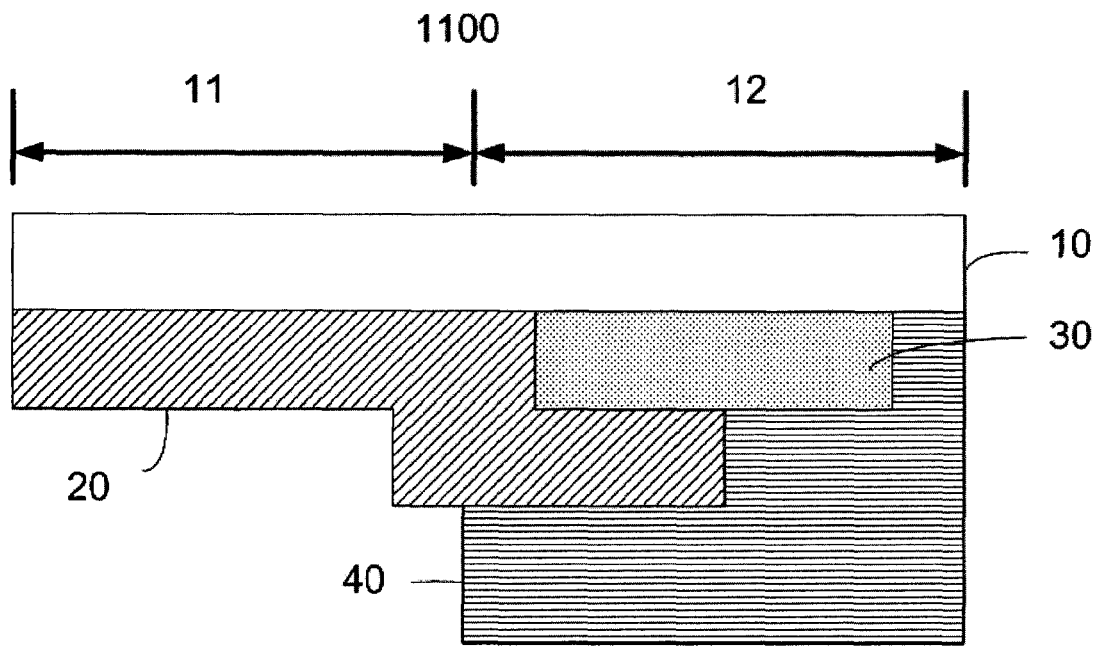
FIG. 11 is a sectional view of a touch panel according to a tenth embodiment of the present invention.

The ninth and tenth embodiments, touch panels 1000 and 1100, are shown in FIG. 10 and FIG. 11, respectively. In these embodiments, a sensing electrode 20, a conductive circuit 30, and a masking element 40 are integrally formed on a singular substrate 10. The substrate 10 comprises a viewable area and a neighboring area next to the viewable area and has supporting and protective functions. The material, the dimension, the viewable area, and/or the position of the conductive circuit 30 are properly chosen to reduce the visual interference. The sensing electrode 20 and the conductive circuit 30 are directly coupled or electrically coupled with a conductive adhesive, and are configured or disposed between the substrate 10 and the masking element 40.

Figure 12:
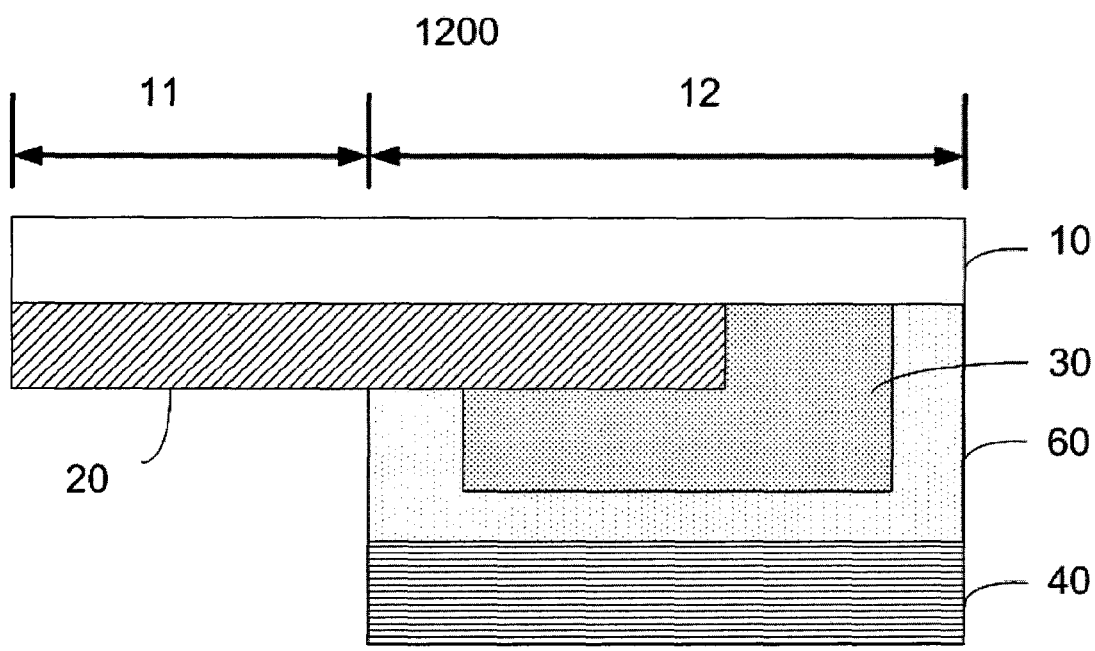
FIG. 12 is a sectional view of a touch panel according to an eleventh embodiment of the present invention.
Figure 13:
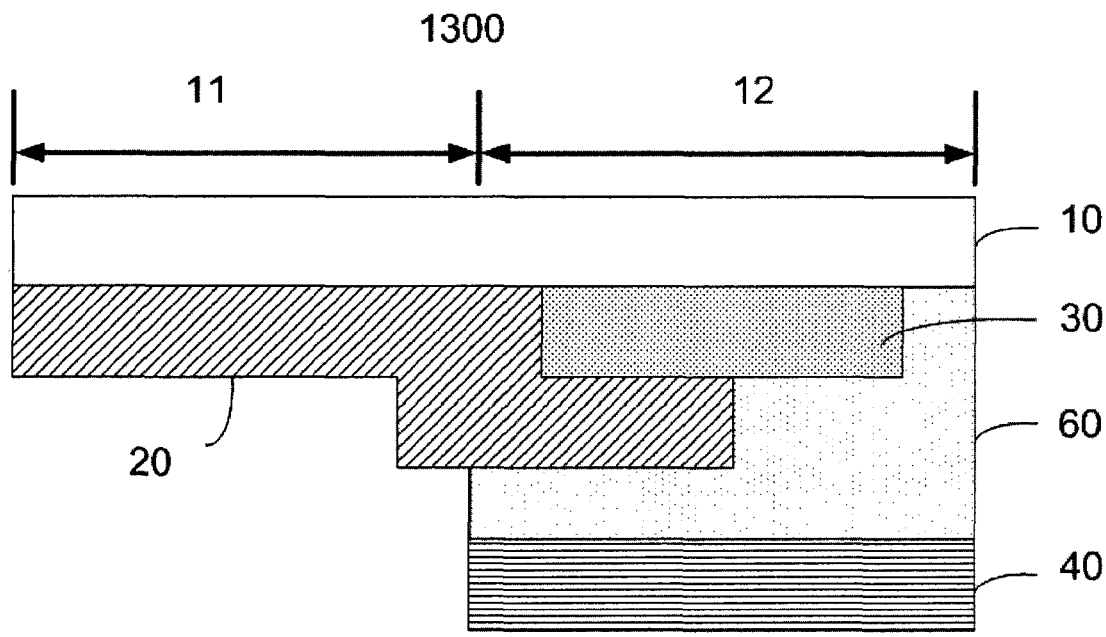
FIG. 13 is a sectional view of a touch panel according to a twelfth embodiment of the present invention.

The eleventh and twelfth embodiments, touch panels 1200 and 1300, are shown in FIG. 12 and FIG. 13, respectively. In these embodiments, a sensing electrode 20, a conductive circuit 30, a masking element 40, and a dielectric element 60 are integrally formed on a singular substrate 10. The substrate 10 comprises a viewable area and a neighboring area next to the viewable area and has supporting and protective functions. The two embodiments have similar structures to the ninth and the tenth embodiments. The properly sized conductive circuit 30 is configured or disposed between substrate 10 and dielectric element 60. The material, the dimension, the viewable area, and/or the position of the conductive circuit 30 are properly chosen to reduce the visual interference. The sensing electrode 20 and the conductive circuit 30 are directly coupled or electrically coupled with a conductive adhesive, and are configured or disposed between the substrate 10 and the dielectric element 60. The dielectric element 60 is configured between the sensing electrode 20 and the masking element 40 and between the conductive circuit 30 and the masking element 40. Thus, the sensing electrode 20 and the conductive circuit 30 are better isolated from the masking element 40 and do not conduct with other sensing electrodes or conductive circuits via the masking element 40.

Figure 14:
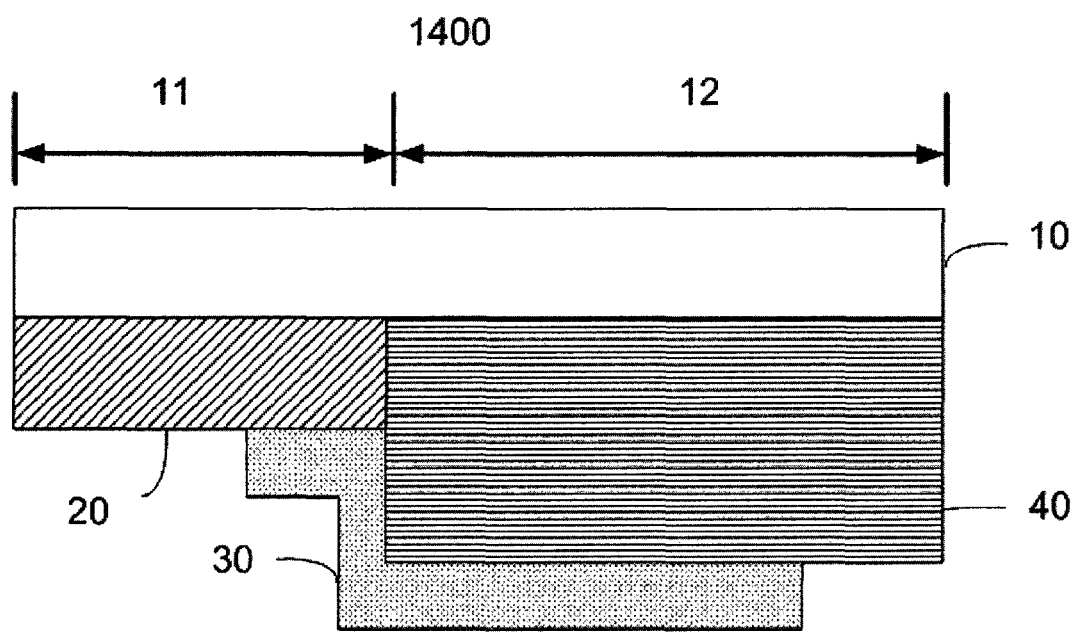
FIG. 14 is a sectional view of a touch panel according to a thirteenth embodiment of the present invention.

A thirteenth embodiment, a touch panel 1400, is shown in FIG. 14. A sensing electrode 20, a conductive circuit 30, and a masking element 40 are integrally formed on a singular substrate 10. The masking element 40 substantially covers the conductive circuit 30. The sensing electrode 20 and the conductive circuit 30 are directly coupled or electrically coupled with a conductive adhesive. The material, the dimension, the viewable area, and/or the position of the conductive circuit 30 are properly chosen to reduce the visual interference.

Figure 15:
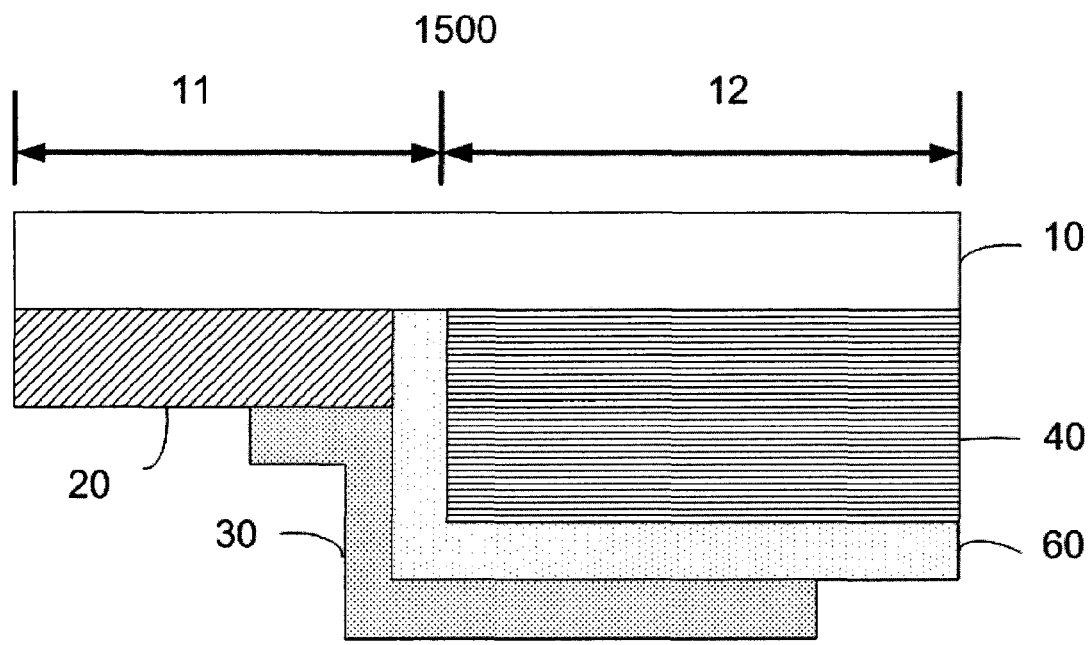
FIG. 15 is a sectional view of a touch panel according to a fourteenth embodiment of the present invention.

A fourteenth embodiment, a touch panel 1500, is shown in FIG. 15. A sensing electrode 20, a conductive circuit 30, a masking element 40, and a dielectric element 60 are integrally formed on a singular substrate 10. The substrate 10 comprises a viewable area and a neighboring area next to the viewable area and has supporting and protective functions. The masking element 40 substantially covers the conductive circuit 30. The material, the dimension, the viewable area, and/or the position of the conductive circuit 30 are properly chosen to reduce the visual interference. The sensing electrode 20 and the conductive circuit 30 are directly coupled or electrically coupled with a conductive adhesive. The dielectric element 60 is configured or disposed between the sensing electrode 20 and the masking element 40 and between the conductive circuit 30 and the masking element 40 for better isolation.

In the aforementioned embodiments, as shown in FIGS. 2-15, the sensing electrode 20, the conductive circuit 30, the masking element 40, and/or the dielectric element 60 are fabricated on the same surface of the substrate 10. In addition to stand-alone touch panels, the present invention can be embodied in other touch sensing devices with singular substrate, for example, an integrally formed touch sensing display. Other kind of materials, such as, anti-scratch, anti-glare, and/or anti-reflective materials, can also be applied. In the following embodiments, the touch panel are fabricated on the two surfaces of the singular substrate 10.

Figure 16:
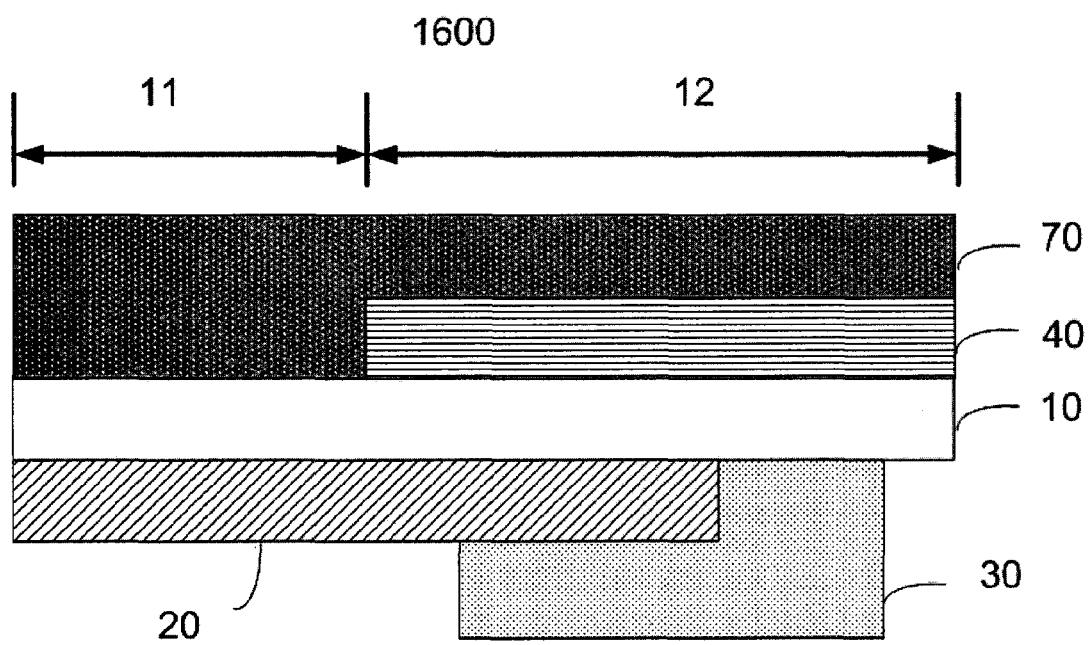
FIG. 16 is a sectional view of a touch panel according to a fifteenth embodiment of the present invention.

A fifteenth embodiment, a touch panel 1600, is shown in FIG. 16. A sensing electrode 20, a conductive circuit 30, a masking element 40, and a protective element 70 are integrally formed on a singular substrate 10. The substrate 10 comprises a viewable area and a neighboring area next to the viewable area and has supporting and protective functions. The sensing electrode 20 and the conductive circuit 30 are directly coupled or electrically coupled with a conductive adhesive on one surface of the substrate 10. The sensing electrode 20 is configured or disposed between the substrate 10 and the conductive circuit 30. The masking element 40 is configured or disposed on the other surface of the substrate 10 and substantially covers the conductive circuit 30. The protective element 70 can be made of aforementioned substantially transparent materials. The protective element 70 substantially covers the masking element 40. Optionally, the protective element can provide anti-scratch, anti-glare, and/or anti-reflective functions. Alternative, the protective element 70 can be omitted. The protective element 70 can be made of the same material of the substrate 10. Alternative, the substrate 10, the masking element 40, and the protective element 70 can be integrally formed before configuring other elements. The masking element 40 is configured or disposed on the different surface from the one having the sensing electrode 20 and the conductive circuit 30. The isolating requirement and the heat tolerance requirement of the masking element 40 can be lower and selected from more materials.

Figure 17:
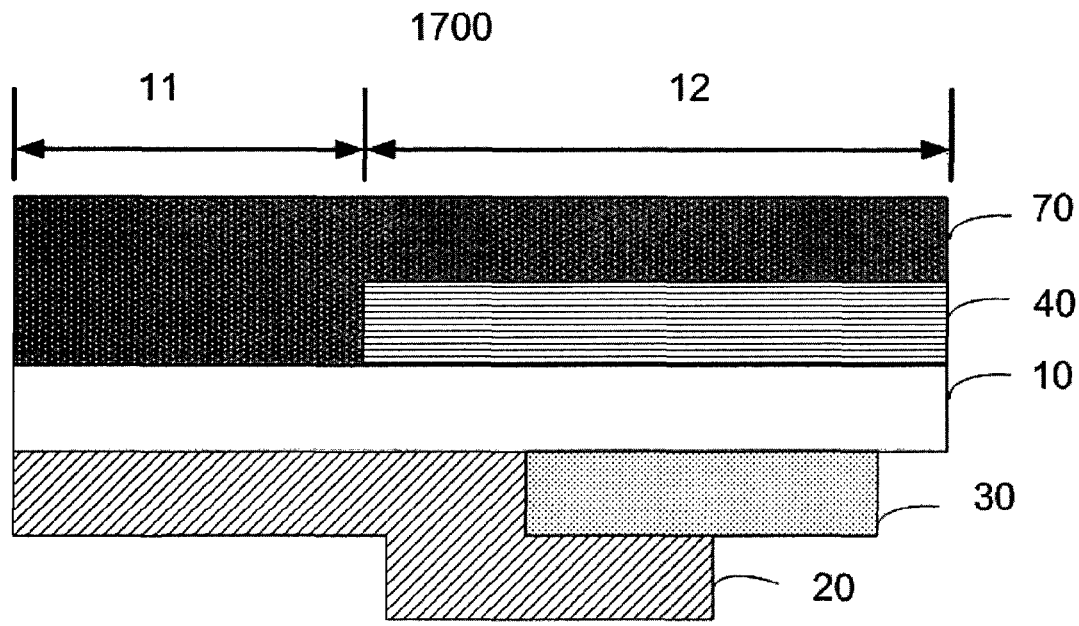
FIG. 17 is a sectional view of a touch panel according to a sixteenth embodiment of the present invention.

A sixteenth embodiment, a touch panel 1700, is shown in FIG. 17. A sensing electrode 20, a conductive circuit 30, a masking element 40, and a protective element 70 are integrally formed on a singular substrate 10. The substrate 10 comprises a viewable area and a neighboring area next to the viewable area and has supporting and protective functions. The sensing electrode 20 and the conductive circuit 30 are directly coupled or electrically coupled with a conductive adhesive on one surface of the substrate 10. The conductive circuit 30 is configured or disposed between the substrate 10 and the sensing electrode 20. The masking element 40 is configured or disposed on the other surface of the substrate 10 and substantially covers the conductive circuit 30. The protective element 70 can be made of aforementioned substantially transparent materials. The protective element 70 substantially covers the masking element 40. Optionally, the protective element 70 can provide anti-scratch, anti-glare, and/or anti-reflective functions. Alternative, the protective element 70 can be omitted.

Figure 18:
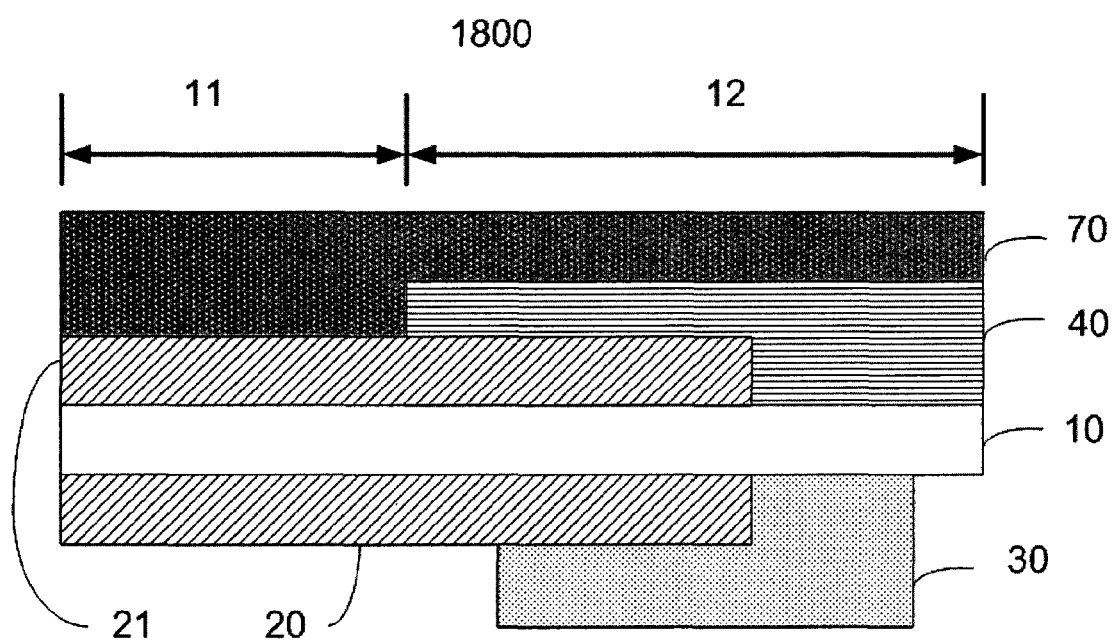
FIG. 18 is a sectional view of a touch panel according to a seventeenth embodiment of the present invention.

A seventeenth embodiment, a touch panel 1800, is shown in FIG. 18. Sensing electrodes 20, 21, a conductive circuit 30, a masking element 40, and a protective element 70 are integrally formed on a singular substrate 10. The substrate 10 comprises a viewable area and a neighboring area next to the viewable area and has supporting and protective functions. The sensing electrodes 20 and 21 are configured or disposed on different surfaces of the substrate 10. The sensing electrode 20 senses the tactile inputs in a first direction and the sensing electrodes 21 sense the tactile input in a second direction. The sensing electrode 20 and the conductive circuit 30 are directly coupled or electrically coupled with a conductive adhesive on one surface of the substrate 10. The sensing electrode 20 is configured or disposed between the substrate 10 and the conductive circuit 30. The masking element 40 is configured or disposed between the other surface of substrate 10 and the protective element 70, and substantially covers the conductive circuit 30. Alternatively, the sensing electrode 21 can be configured or disposed between the protective element 70 and the masking element 40, or the protective element 70 can be configured or disposed between the sensing electrode 21 and the masking element 40. Also, the sensing electrode 21 and the masking element 40 can be configured without overlapping between the protective element 70 and the substrate 10, or the protective element can be configured without overlapping between substrate 10 and sensing electrode 21. The protective element 70 substantially covers the masking element 40 or covers the entire surface the substrate 10. Optionally, the protective element can have a reflective index close to the reflective index of the sensing electrode 21 and/or can provide anti-scratch, anti-glare, and/or anti-reflective functions. Alternatively, the protective element 70 can be omitted.

Figure 19:
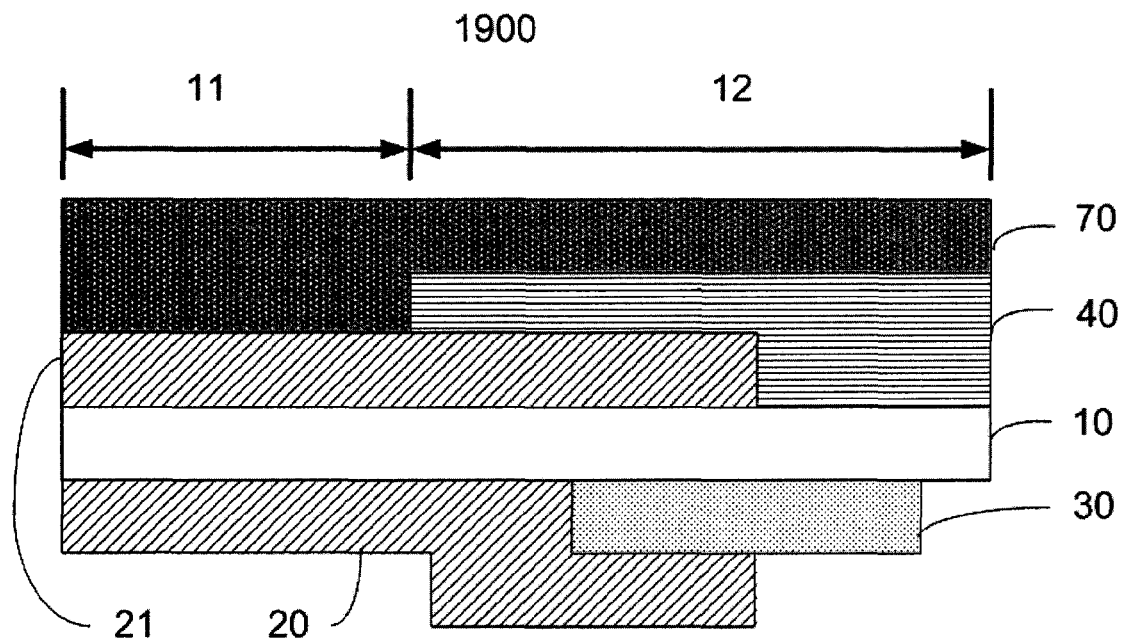
FIG. 19 is a sectional view of a touch panel according to an eighteenth embodiment of the present invention.

An eighteenth embodiment, a touch panel 1900, is shown in FIG. 19. Sensing electrodes 20, 21, a conductive circuit 30, a masking element 40, and a protective element 70 are integrally formed on a singular substrate 10. The substrate 10 comprises a viewable area and a neighboring area next to the viewable area and has supporting and protective functions. The sensing electrodes 20 and 21 are configured or disposed on different surfaces of the substrate 10. The sensing electrode 20 and the conductive circuit 30 are directly coupled or electrically coupled with a conductive adhesive on one surface of the substrate 10. The conductive circuit 30 is configured between the substrate 10 and the sensing electrode 20. The masking element 40 is configured or disposed on the other surface of substrate 10 and between the substrate 10 and the protective element 70. The masking element 40 substantially covers the conductive circuit 30. Alternatively, the sensing electrode 21 can be configured or disposed between the protective element 70 and the masking element 40, or the protective element 70 can be configured or disposed between the sensing electrode 21 and the masking element 40. Also, the sensing electrode 21 and the masking element 40 can be configured or disposed without overlapping between the protective element 70 and the substrate 10, or configured without overlapping on the protective element 70. The protective element 70 substantially covers the masking element 40 and the sensing electrode 21. Optionally, the protective element 70 can have a reflective index close to the reflective index of the sensing electrode 21 and/or can provide anti-scratch, anti-glare, and/or anti-reflective functions. Alternatively, the protective element 70 can be omitted.

Figure 20:
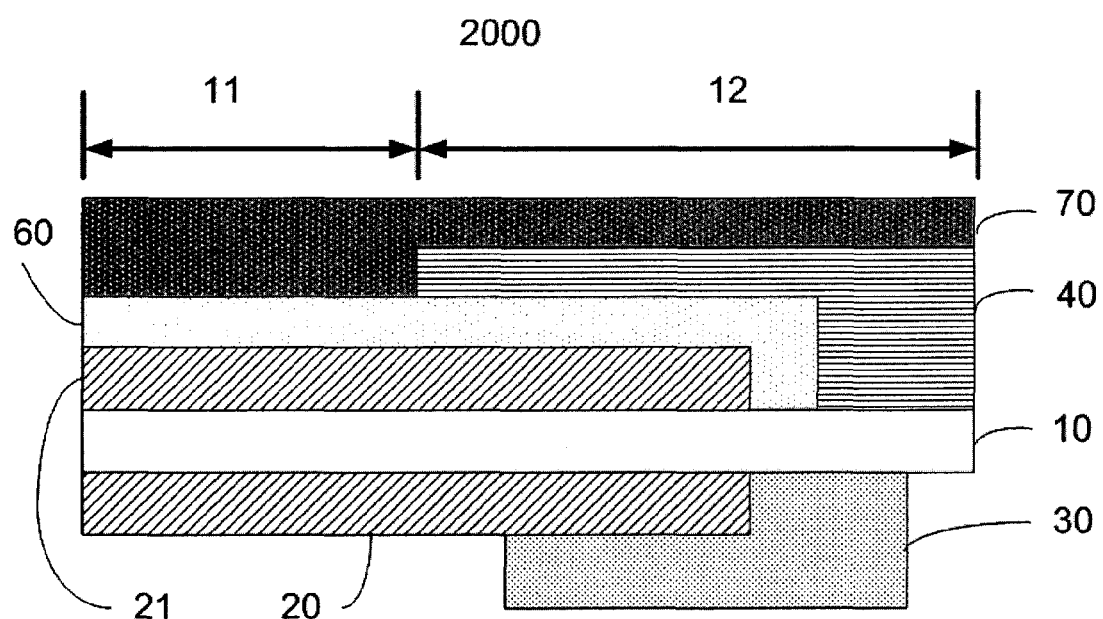
FIG. 20 is a sectional view of a touch panel according to a nineteenth embodiment of the present invention.

A nineteenth embodiment, a touch panel 2000, is shown in FIG. 20. Sensing electrodes 20, 21, a conductive circuit 30, a masking element 40, a dielectric element 60, and a protective element 70 are integrally formed on a singular substrate 10. The substrate 10 comprises a viewable area and a neighboring area next to the viewable area and has supporting and protective functions. The sensing electrodes 20 and 21 are configured or disposed on different surfaces of the substrate 10. The sensing electrode 20 and the conductive circuit 30 are directly coupled or electrically coupled with a conductive adhesive on one surface of the substrate 10. The sensing electrode 20 is configured or disposed between the substrate 10 and the conductive circuit 30. The masking element 40 is configured or disposed between the protective element 70 and the dielectric element 60 and substantially covers the conductive circuit 30. Alternatively, the protective element 70 can be configured or disposed between the dielectric element 60 and the masking element 40. Beside, the sensing electrode 21, the dielectric element 60 and the masking element 21 can be configured without overlapping between the protective element 70 and the substrate 10, or configured without overlapping on the protective element 70. The protective element 70 substantially covers the masking element 40 and the sensing electrode 21 for providing the anti-scratch, anti-glare, and/or anti-reflective functions. Alternatively, the protective element 70 can be omitted. In addition, the dielectric element 60 is configured between the sensing electrode 21 and the masking element 40 for providing better isolation. Thus, the sensing electrode 21 does not conduct with other sensing electrodes via the masking element 40. Optionally, the dielectric element 60 can have a reflective index close to the reflective index of the sensing electrode 21 so that the visual interference of the sensing electrode 21 can be reduced.

Figure 21:
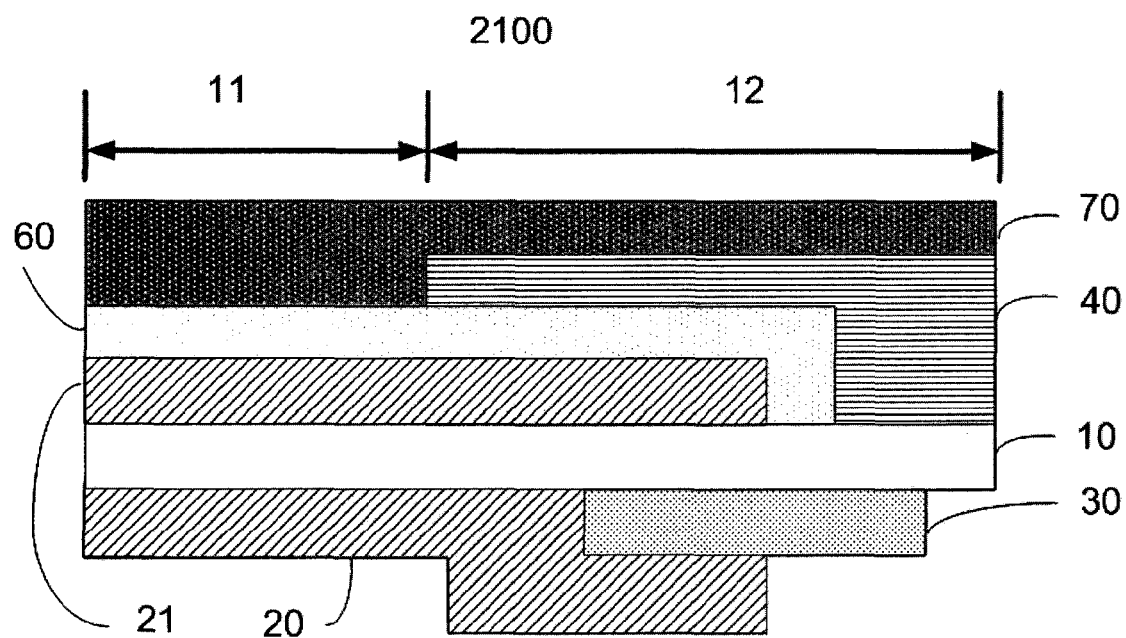
FIG. 21 is a sectional view of a touch panel according to a twentieth embodiment of the present invention.

A twentieth embodiment, a touch panel 2100, is shown in FIG. 21. A sensing electrodes 20, 21, a conductive circuit 30, a masking element 40, a dielectric element 60, and a protective element 70 are integrally formed on a singular substrate 10. The substrate 10 comprises a viewable area and a neighboring area next to the viewable area and has supporting and protective functions. The sensing electrodes 20 and 21 are configured on different surfaces of the substrate 10. The sensing electrode 20 and the conductive circuit 30 are directly coupled or electrically coupled with a conductive adhesive on one surface of the substrate 10. The conductive circuit 30 is configured between the substrate 10 and the sensing electrode 20. The masking element 40 is configured between the protective element 70 and the dielectric element 60 and substantially covers the conductive circuit 30. Alternatively, the protective element 70 can be configured between the dielectric element 60 and the masking element 40. Also, the sensing electrode 21, the dielectric element 60 and the masking element 40 can be configured without overlapping between the protective element 70 and the substrate 10, or configured without overlapping on the protective element 70. The protective element 70 substantially covers the masking element 40 and the sensing electrode 21 for providing the anti-scratch, anti-glare, and/or anti-reflective functions. Alternatively, the protective element 70 can be omitted. In addition, the dielectric element 60 is configured or disposed between the sensing electrode 21 and the masking element 40 for providing better isolation. Thus, the sensing electrode 21 does not conduct with other sensing electrodes via the masking element 40.

This invention has been described with reference to embodiments. It shall be understood, however, that many alternative modifications and variations will be apparent to those having ordinary skill in the pertinent art in light of the foregoing description. Accordingly, the present invention embraces all such alternative modifications and variations as fall within the spirit and scope of the appended claims.

What is claimed is:

1. A touch panel stackup, comprising:
a singular integrated substrate having a display region and a neighboring region next to the display region;
a sensing electrode formed on the singular integrated substrate, wherein the sensing electrode has a first section formed in the display region and a second section formed in the neighboring region, wherein:
the first section of the sensing electrode and a portion of the second section of the sensing electrode lie within a common plane,
the portion of the second section overlies a through hole, and
the first section and the portion of the second section are disposed on a first surface of the singular integrated substrate;
a masking element configured on the neighboring region to cover the second section of the sensing electrode without covering the first section of the sensing electrode, wherein:
the masking element is substantially opaque and has a first surface and a second surface opposite to the first surface, and
the sensing electrode and the masking element are integrally formed so that the first surface of the masking element directly contacts a surface of the second section of the sensing electrode; and
a conductive circuit configured on the neighboring region and electrically connected to the sensing electrode, wherein:
the conductive circuit is formed on the second surface of the masking element, and
the integrally formed sensing electrode and masking element are positioned on the first surface of the singular integrated substrate.

2. The touch panel stackup of claim 1, wherein the sensing electrode is electrically coupled with the conductive circuit via a conductive path extending from the first surface of the masking element to the second surface of the masking element.

3. The touch panel stackup of claim 1, wherein:
the through hole is formed in the masking element,
the conductive circuit has a main portion formed on the second surface of the masking element and a branch portion formed in the through hole, and
the branch portion connects to the portion of the second section of the sensing electrode.

4. The touch panel stackup of claim 3, wherein the main portion of the conductive circuit directly contacts the second surface of the masking element.

5. The touch panel stackup of claim 1, wherein:
the masking element is an L-shaped structure,
one arm portion of the L-shaped masking element is formed on the first surface of the singular integrated substrate, and
the other arm portion of the L-shaped masking element is formed on the surface of the second section of the sensing electrode.

6. The touch panel stackup of claim 1, wherein:
the conductive circuit has a main portion formed on the second surface of the masking element and a branch portion vertically connected with the main portion,
the masking element has a first arm portion formed on the first surface of the singular integrated substrate and a second arm portion formed on the surface of the second section of the sensing electrode, and
the branch portion of the conductive circuit penetrates through the second arm portion of the masking element to contact the second section of the sensing electrode.

7. The touch panel stackup of claim 1, wherein the sensing electrode extends in one direction.

8. The touch panel stackup of claim 1, wherein the sensing electrode extends in two directions.

9. The touch panel stackup of claim 1, wherein the singular integrated substrate is made of inorganic non-conductive materials or organic non-conductive materials.

10. The touch panel stackup of claim 1, wherein:
an element is configured on the singular integrated substrate, and
the element is made of anti-scratch material, anti-glare material, or anti-reflective material.

11. The touch panel stackup of claim 1, wherein the sensing electrode is made of Indium Tin Oxide, Aluminum Zinc Oxide, Zinc Tin Oxide, conductive glass, conductive polymer, or carbon nanotube.

12. The touch panel stackup of claim 1, wherein the conductive circuit is made of aluminum, silver, or copper.

13. The touch panel stackup of claim 1, wherein the sensing electrode and the conductive circuit are made of a same material.

14. The touch panel stackup of claim 1, wherein the masking element is made of substantially opaque photoresist, resin, or ink.

15. The touch panel stackup of claim 1, wherein the neighboring region is configured on an edge of the singular integrated substrate.

16. The touch panel stackup of claim 1, wherein the masking element is pasted, printed, dyed, sputtered, or coated on the singular integrated substrate.

17. The touch panel stackup of claim 1, wherein:
the first section of the sensing electrode further comprises a sensing electrode pattern and a conductor connected to the sensing electrode pattern, and
the connected sensing electrode pattern and the conductor are extended in one direction.

18. The touch panel stackup of claim 1, further comprising a plurality of isolating elements, wherein:
the first section of the sensing electrode comprises a plurality of first sensing electrode patterns, a plurality of first conductors each connected between adjacent first sensing electrode patterns, a plurality of second sensing electrode patterns and a plurality of second conductors each connected between adjacent second sensing electrode patterns, each of the isolating elements is disposed between a corresponding first conductor and a corresponding second conductor the connected first sensing electrode patterns and the first conductors are extended in a first direction, and the connected second sensing electrode patterns and the second conductors are extended in a second direction.

19. The touch panel stackup of claim 1, wherein the through hole is formed in the masking element and has a diameter of less than 30 μm.

20. The touch panel stackup of claim 1, wherein the second section of the sensing electrode is between the singular integrated substrate and a portion of the masking element.

21. The touch panel stackup of claim 1, wherein:
the masking element has a third surface opposite to the second surface of the masking element, and
the third surface of the masking element directly contacts the singular integrated substrate.

22. The touch panel stackup of claim 1, wherein:
the conductive circuit has a main portion formed on the second surface of the masking element and a branch portion formed in the through hole, and
the masking element is disposed between the main portion of the conductive circuit and the singular integrated substrate.

23. The touch panel stackup of claim 22, wherein the second section of the sensing electrode is between the branch portion of the conductive circuit and the singular integrated substrate.

24. The touch panel stackup of claim 1, wherein:
the conductive circuit has a main portion formed on the second surface of the masking element and a branch portion formed in the through hole, and
the second section of the sensing electrode is between the branch portion of the conductive circuit and the singular integrated substrate.

* * * * *